(12) United States Patent
Herbert et al.

(10) Patent No.: US 12,014,127 B2
(45) Date of Patent: Jun. 18, 2024

(54) TRANSFORMING A LOGICAL NETLIST INTO A HIERARCHICAL PARASITIC NETLIST

(71) Applicant: Synopsys, Inc., Mountain View, CA (US)

(72) Inventors: Jeffrey C. Herbert, Naples, FL (US); Matthew Christopher Lanahan, Fairfield, VT (US); John Edward Barth, Williston, VT (US)

(73) Assignee: Synopsys, Inc., Sunnyvale, CA (US)

( * ) Notice: Subject to any disclaimer, the term of this patent is extended or adjusted under 35 U.S.C. 154(b) by 156 days.

(21) Appl. No.: 17/668,180

(22) Filed: Feb. 9, 2022

(65) Prior Publication Data

US 2023/0252208 A1 Aug. 10, 2023

(51) Int. Cl.
*G06F 30/323* (2020.01)
*G06F 30/392* (2020.01)

(52) U.S. Cl.
CPC .......... *G06F 30/323* (2020.01); *G06F 30/392* (2020.01)

(58) Field of Classification Search
CPC .............................. G06F 30/323; G06F 30/392
USPC ....................................................... 716/103
See application file for complete search history.

(56) References Cited

U.S. PATENT DOCUMENTS

| | | | |
|---|---|---|---|
| 6,374,205 B1 * | 4/2002 | Kuribayashi | G06F 30/367 703/22 |
| 8,365,113 B1 * | 1/2013 | Bhardwaj | G06F 30/30 716/108 |
| 9,805,156 B2 | 10/2017 | Gurney et al. | |
| 2005/0108672 A1 | 5/2005 | Teene | |
| 2013/0318489 A1 | 11/2013 | Chandramohan et al. | |
| 2014/0270050 A1 * | 9/2014 | Wang | G11C 19/28 377/67 |
| 2015/0186591 A1 * | 7/2015 | Gurney | G06F 30/398 716/116 |
| 2022/0085018 A1 * | 3/2022 | Sherlekar | G06F 30/31 |
| 2022/0300688 A1 * | 9/2022 | Moceyunas | G06F 30/323 |
| 2023/0244844 A1 * | 8/2023 | Barth | G06F 30/3315 711/154 |
| 2023/0260591 A1 * | 8/2023 | Herbert | G06F 30/367 703/14 |

OTHER PUBLICATIONS

International Search Report and Written Opinion, International Application No. PCT/US2023/010829, dated May 9, 2023, consists of 16 pages.

* cited by examiner

*Primary Examiner* — Eric D Lee
(74) *Attorney, Agent, or Firm* — Patterson + Sheridan, LLP

(57) ABSTRACT

A system and method for generating a netlist of a memory device includes receiving a logical netlist file including memory instances and placement information for the memory device. Each memory instance includes leaf cells. Further, a location of a first leaf cell and a location of a second leaf cell of the leaf cells of a first memory instance is determined based on the placement information. A first net segment between the first leaf cell and the second leaf cell is generated based on the location and parasitic elements of the first leaf cell and the location and parasitic elements of the second leaf cell. A parasitic netlist is generated based on the first net segment and the parasitic elements of the first leaf cell and parasitic elements of the second leaf cell.

20 Claims, 11 Drawing Sheets

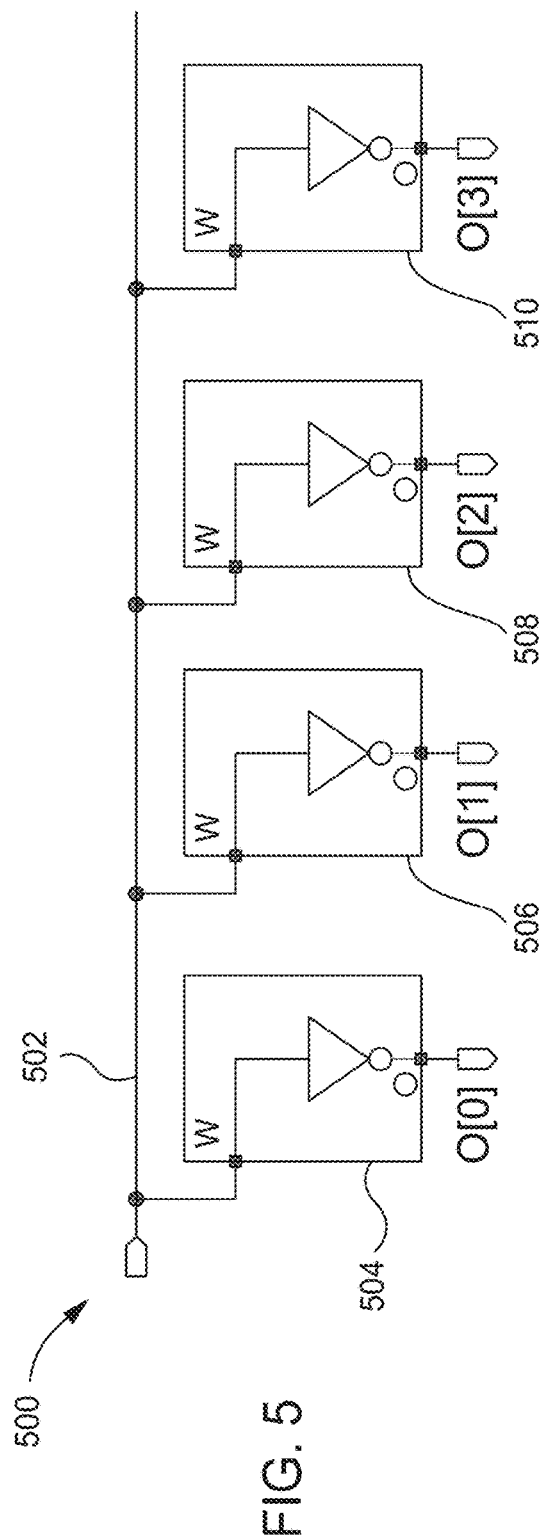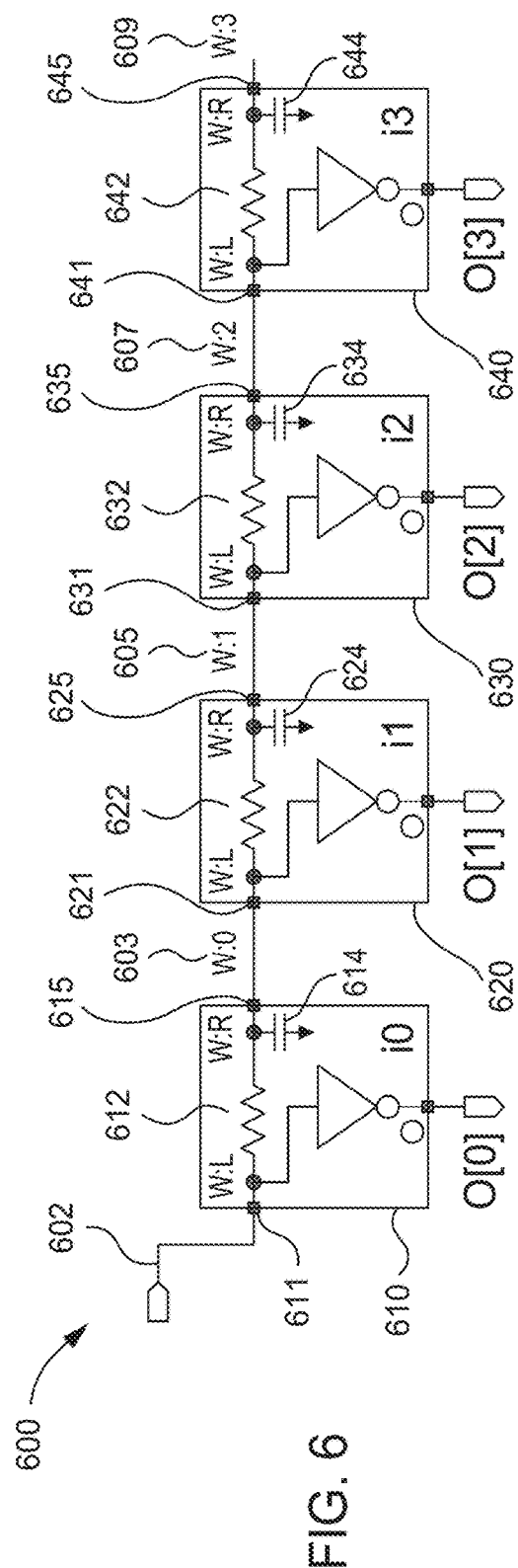
FIG. 5
FIG. 6

TRANSFORMING A LOGICAL NETLIST INTO A HIERARCHICAL PARASITIC NETLIST

TECHNICAL FIELD

The present disclosure generally relates to an electronic design automation system. In particular, the present disclosure relates to a system and method for transforming a logical netlist into a hierarchical parasitic netlist with net segments between leaf cells.

BACKGROUND

A memory compiler system creates different types and configurations of memories (e.g., static random access memory (SRAM)) from leaf cells, where a leaf cell is a standard library cell used to construct a memory instance. Typically, during a simulation phase of the memory compiling process, a netlist of a memory instance is extracted. Extracting the netlist of a memory instance having large hierarchical designs is time intensive, processor resource intensive, and memory resource intensive. Further, the extracted netlist is difficult to modify as the netlist does not utilize replication of memory designs. A memory instance is assembled using a logical netlist of the high-level interconnects. However, the logical netlist does not include the parasitic resistances and parasitic capacitances between leaf cells. Accordingly, to extract the parasitic resistances and parasitic capacitances, the hierarchy of each leaf cell is extracted. However, such a process is time, processor resource, and memory resource intensive.

SUMMARY

In one example, a method includes receiving a logical netlist file for a memory device and placement information for the memory device. The logical netlist file includes memory instances of the memory device. Each memory instance includes leaf cells. The method further includes determining a location of a first leaf cell and a location of a second leaf cell of the leaf cells of a first memory instance of the memory instances based on the placement information. Further, the method includes generating a first net segment between the first leaf cell and the second leaf cell based on the location and parasitic elements of the first leaf cell and the location and parasitic elements of the second leaf cell. Further, the method includes generating a parasitic netlist based on the first net segment and the parasitic elements of the first leaf cell and parasitic elements of the second leaf cell.

In one example, a system comprises a memory storing instructions, and a processor, coupled with the memory to execute the instructions. The instructions when executed cause the processor to receive a logical netlist file for a memory device and a placement information for the memory device. The logical netlist file includes a plurality of nets and a plurality of leaf cells. Further, the instructions when executed cause the processor to select a first net of the plurality of nets. The first net includes first leaf cells of the plurality of leaf cells. The instructions when executed cause the processor to further generate a first net segment for the first net. The first net segment connects a first leaf cell and a second leaf cell of the first leaf cells. The instructions when executed cause the processor to further output a parasitic netlist generated based on the first net segment.

In one example, a non-transitory computer readable medium comprising stored instructions, which when executed by a processor, cause the processor to determine a location of a first leaf cell and a second leaf cell of leaf cells of a first memory instance of a memory device from a logical netlist file based on placement information. Further, the processor is caused to generate a first net segment between the first leaf cell and the second leaf cell based on the location of the first leaf cell and the second leaf cell. The processor is further caused to replace one or more of the first leaf cell with a first parasitic leaf cell and the second leaf cell with a second parasitic leaf cell based on hierarchical information of the first leaf cell and the second leaf cell. Further, the processor is caused to generate a parasitic netlist based on the first net segment, and at least one of the first parasitic leaf cell and the second parasitic leaf cell.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 5 illustrates a diagram of a net based on a logical netlist, according to one or more examples.

FIG. 6 illustrates a diagram of a net including parasitic resistances and parasitic capacitances, according to one or more examples.

DETAILED DESCRIPTION

Figure 1:
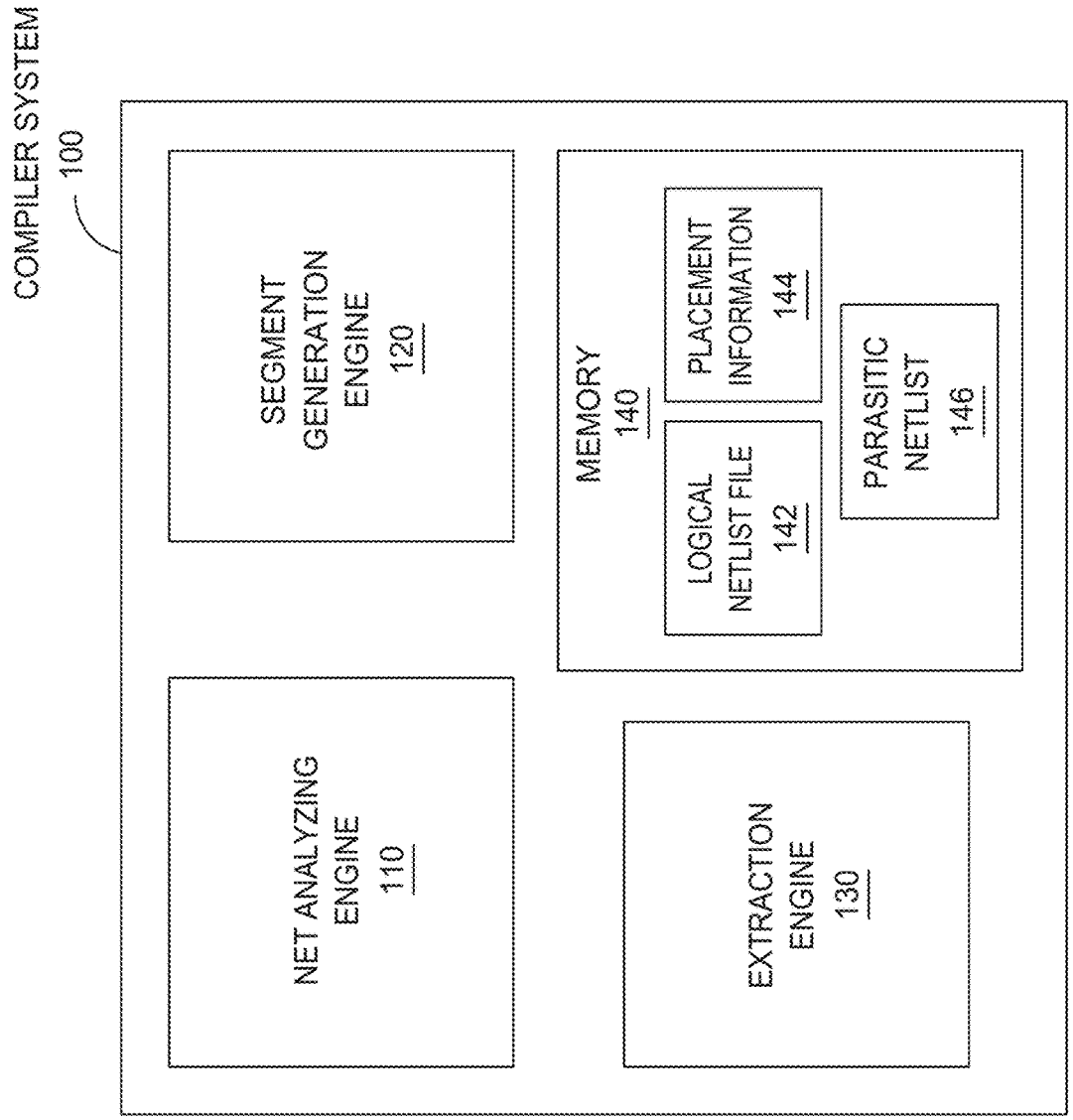
FIG. 1 illustrates a block diagram of a compiler system, according to one or more examples.

Aspects of the present disclosure relate to transforming a logical netlist into a hierarchical parasitic netlist.

A memory design includes a multi-dimensional array of leaf cells. The interconnections of the memory design are placed inside the leaf cells of the memory. The parasitic resistances and capacitances of the interconnections reside within the leaf cells of the memory design. To extract the parasitic resistances and parasitic capacitances, the hierarchy in each leaf cell is extracted. Accordingly, the extraction process, and the corresponding simulation process, is processor resource and memory insensitive. Contrary, in the typical design of other integrated circuit (IC) devices (e.g., non-memory IC devices), the interconnections are placed over the cell leafs. Accordingly, during the netlist extraction process of a typical IC device design, the connectivity of the interconnections above the cell leafs is also extracted.

Memory compilers build different types and configurations of memories from different combinations and different types of leaf cells. Leaf cells are the atomic units (e.g., lowest level) used to construct memory instances of memory devices. The leaf cells are developed to allow a memory compiler to reuse the leaf cells to construct a number of different memory configurations. Different types of leaf cells having different functions related to the functionality of a memory may be used by a memory compiler to generate a memory device.

A memory compiler places different combinations of leaf cells in a hierarchical configuration based on a memory design. The leaf cells are connected at the boundaries of the leaf cells by abutting the leaf cells, with the parasitic resistances and parasitic capacitances being inside the leaf cells, at a lower hierarchy. For examples, as the leaf cells are placed next to each other such that edges of the leaf cells are touching (e.g., abutted), the leaf cells are connected to each other. The memory compiler places the leaf cells using an abutment placement process to place leaf cells next to each other and to connect the leaf cells. The abutted adjacent leaf cells are connected to each other. For example, an output port of one leaf cell is connected to an input port on another abutted leaf cell.

A memory device includes multiple memory instances. Each memory instance includes multiple leaf cells and multiple different types of leaf cells. In one example, a memory device includes a thousand or more memory instances, and each memory instance is built from twenty or more leaf cells. In other examples, a memory device may include other numbers of memory instances. Further, memory instances may include more or less than twenty leaf cells.

A typical extraction process extracts each memory instance as a parasitic netlist. However, in such an extraction process, the hierarchy of the memory design is lost. Accordingly, the extraction process is performed on each of the different memory instances. Based on the example above, the extraction process is performed on each of the one thousand different memory instances. However, such a process is time consuming, and processor resource and memory resource intensive. The present netlist extraction process described herein is performed on each of the leaf cells of the memory instances, rather than on the individual memory instances. A hierarchical logical netlist, placement information, and leaf cells with extracted parasitics (e.g., parasitic resistances and/or parasitic capacitances) are used to generate a parasitic netlist. For example, leaf cells of a common net are determined from the hierarchical logical netlist. Net segments are generated between leaf cells of the common net based on the placement information and the leaf cells. The leaf cells of a common net are ordered based on the placement information, and the parasitics of each leaf cell are extracted. The net segments are generated based on the placement information and the extracted parasitics. A parasitic netlist is generated based on the net segments and the leaf cells with the extracted parasitics. The parasitic netlist may be referred to as a hierarchical stitched parasitic netlist as the leaf cells in the nets of the netlists are stitched together via the net segments. The parasitic netlist is significantly smaller than a fully extracted netlist, and thus transient simulation of this netlist is faster while also requiring fewer processor and less memory space. Further, this parasitic netlist is faster to extract as instead of performing an extraction process on each different memory instance, an extraction process is performed on the different leaf cells that make up the memory instances (e.g., the extraction process is performed on about 20 different leaf cells instead of a thousand different memory instances). Accordingly, the netlist extraction process described herein uses significantly less processor resources, memory resources, and processing time, as compared to traditional netlist extraction processes. Thus, the cost to implement the present netlist extraction process described herein is significantly lower than that of conventional processes, allowing processor resources, memory resources, and processing time to be freed and become available to perform other tasks. Further, hierarchical manipulations may be performed on the parasitic netlist to reconfigure the hierarchy of the parasitic netlist, improving the simulation performance of the parasitic netlist.

FIG. 1 illustrates a block diagram of a compiler system, according to one or more examples. A compiler system 100 includes a net analyzing engine 110, a segment generation engine 120, an extraction engine 130, and a memory 140. The compiler system 100 may be a memory compiler system, or other compiler systems. The compiler system 100 compiles memory instances of a memory device. For example, the compiler system 100 compiles memory instances by placing leaf cells within the memory instance based on compiler rules and the design of the corresponding memory device. In one example, the memory compiling process includes a netlist extraction process. The netlist extraction process uses hierarchy within the memory design to generate a parasitic netlist. For example, the netlist extraction process described herein is performed on the leaf cells of a memory instance instead of on each of the individual memory instances. In one example, the compiler system 100 receives a logical netlist file 142 and placement information 144 for a memory device. The compiler system 100 sorts logical netlist instances based on the logical netlist file 142 and placement information 144, and generates net segments between connected leaf cells of a memory instance. Further, the compiler system 100 replaces logical instances within the logical netlist with parasitic instances determined from the net segments and sorting of the logical netlist instances, and generates a parasitic netlist 146.

The parasitic netlist 146 is used to simulate the memory device. For example, the compiler system 100, or another system, simulates the functionality of a memory device using the parasitic netlist.

Figure 12:
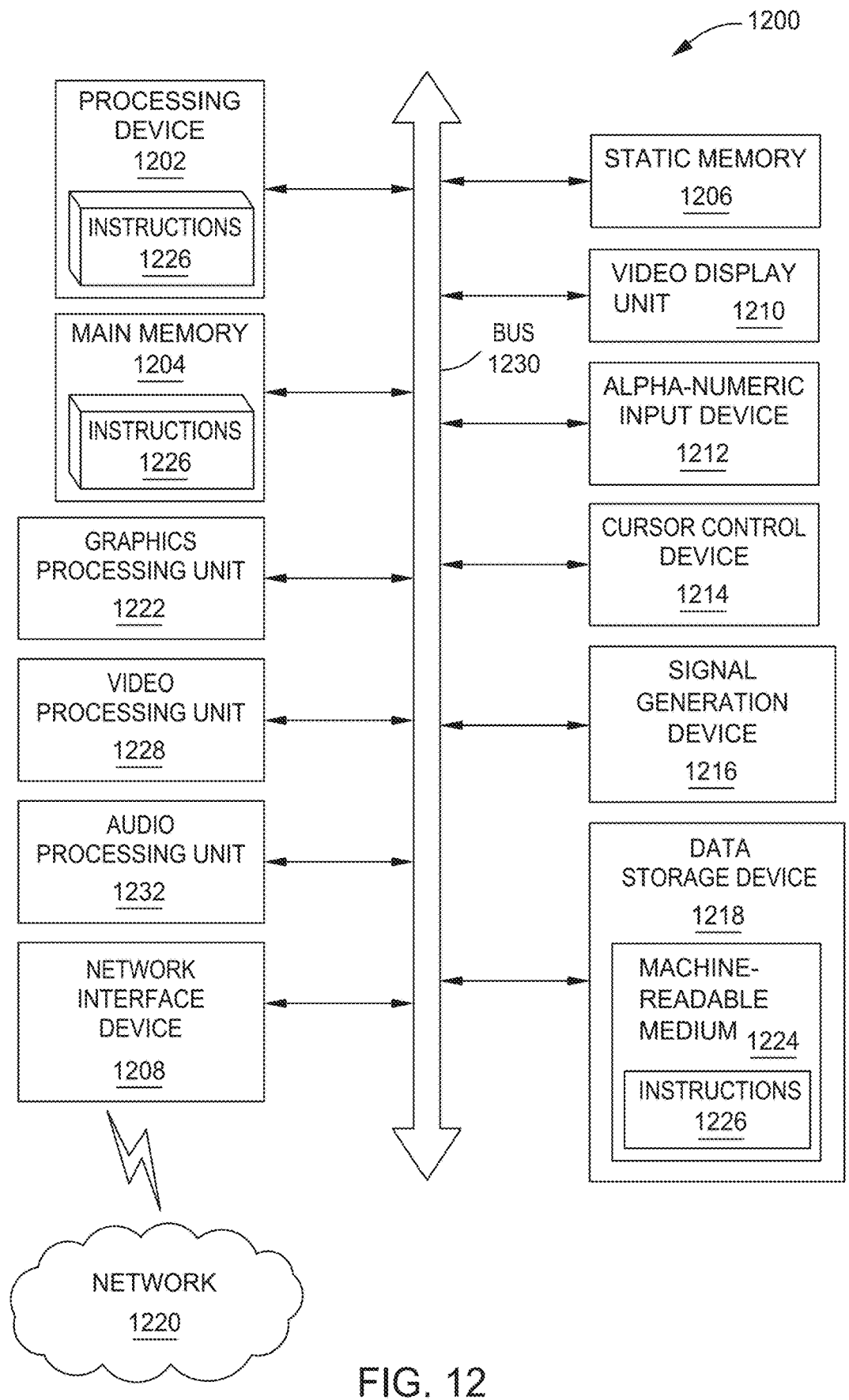
FIG. 12 depicts a representative diagram of an example computer system in which embodiments of the present disclosure may operate.

The compiler system 100 includes one or more processors (e.g., the processing device 1202 of FIG. 12) that execute instructions (e.g., the instructions 1226 of FIG. 12) stored in a memory (e.g., the memory 140, the main memory 1204 and/or the machine-readable medium 1224 of FIG. 12) to generate a parasitic netlist from a memory device based on hierarchy of a memory design.

The net analyzing engine 110 includes one or more processors (e.g., the processing device 1202 of FIG. 12) that execute instructions (e.g., the instructions 1226 of FIG. 12) stored in a memory (e.g., the memory 140, the main memory 1204 and/or the machine-readable medium 1224 of FIG.

12). The net analyzing engine 110 receives a logical netlist file 142 and placement information 144. As is described in more detail in the following, the net analyzing engine 110 sorts the logical netlist instances into an array of rows and columns. Sorted logical netlist instances includes sorting the placement of the leaf cells of each instance. For example, the location of the leaf cells relative to each other is determined.

The segment generation engine 120 includes one or more processors (e.g., the processing device 1202 of FIG. 12) that execute instructions (e.g., the instructions 1226 of FIG. 12) stored in a memory (e.g., the memory 140, the main memory 1204 and/or the machine-readable medium 1224 of FIG. 12). As is described in greater detail in the following, the net analyzing engine 110 generates net segments between connected leaf cells from the sorted instances. The net segments are stored within the memory 140.

The extraction engine 130 includes one or more processors (e.g., the processing device 1202 of FIG. 12) that execute instructions (e.g., the instructions 1226 of FIG. 12) stored in a memory (e.g., the memory 140, the main memory 1204 and/or the machine-readable medium 1224 of FIG. 12). As is described in greater detail in the following, the extraction engine 130 extracts a parasitic netlist 146 from the logical netlist file 142, the net segments stored within the memory 140, and the hierarchical information of the leaf cells within the memory instances of the memory device. In one example, the parasitic netlist 146 is stored within the memory 140. The parasitic netlist 146 may be referred to as a stitched netlist. The parasitic netlist 146 includes the net segments between leaf cells and the parasitic elements (e.g., parasitic resistance and parasitic capacitance) of each of the leaf cells.

The memory 140 is configured similar to the main memory 1204 of FIG. 12 or the computer readable-medium 1224 of FIG. 12.

Figure 2:
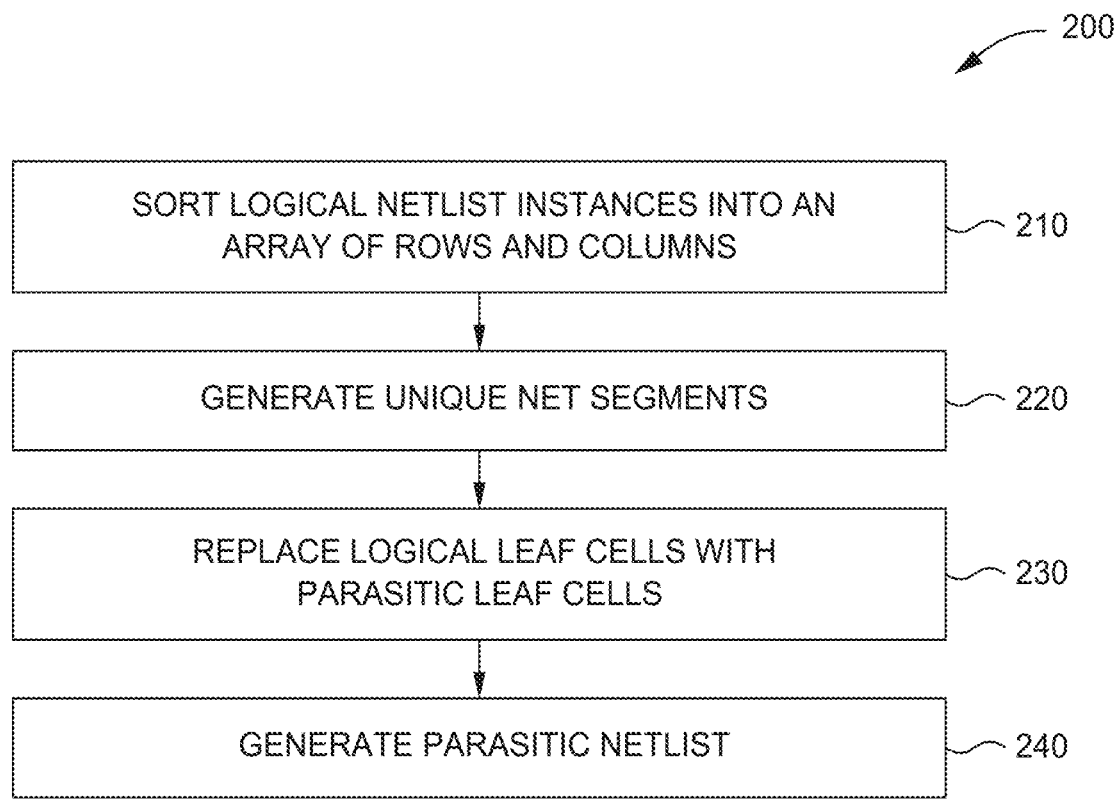
FIG. 2 illustrates a flowchart of a method for generating a parasitic netlist, according to one or more examples.

FIG. 2 illustrates a flowchart of a method for generating a parasitic netlist, according to one or more examples. A method 200 is performed by the compiler system 100. For example, one or more processors of the compiler system 100 executes instructions stored within a memory to perform the method 200. In one example, the method 200 is performed as part of design planning 1122 of FIG. 11, and/or physical implementation 1124 of FIG. 11.

At 210 of the method 200, logical netlist instances (e.g., leaf cells) are sorted into an array having one or more rows and/or one or more columns. The net analyzing engine 110 obtains the logical netlist file 142 and the placement information form the memory 140. The net analyzing engine 110 sorts the leaf cells of the logical netlist file 142 based on the placement information 144.

In one example, the compiler system 100 places leaf cells to build a memory instance or instances of a memory device based on the logical netlist file 142. In the logical netlist file 142, the leaf cells may be connected in any order. FIG. 7 illustrates a diagram of a net with unordered leaf cells, according to one or more examples. In net 700, the leaf cells X3, X2, X0, and X1 are connected but not based on a specified order and not based on placement information.

Figure 7A:
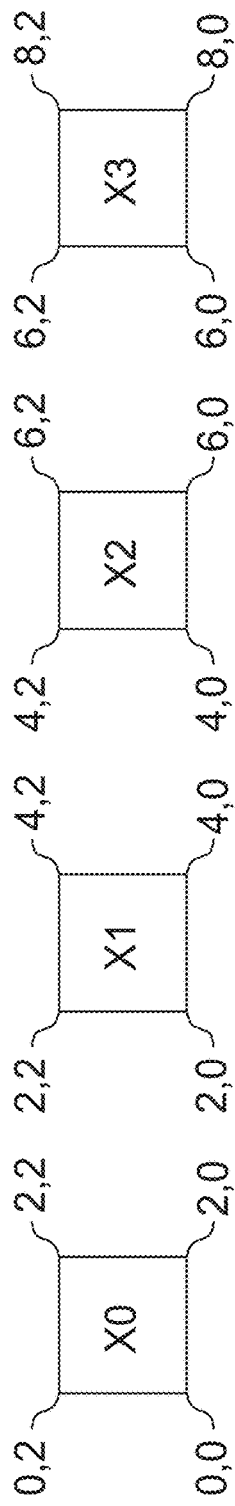
FIG. 7A illustrates a diagram of leaf cells with placement information, according to one or more examples.
Figure 7B:
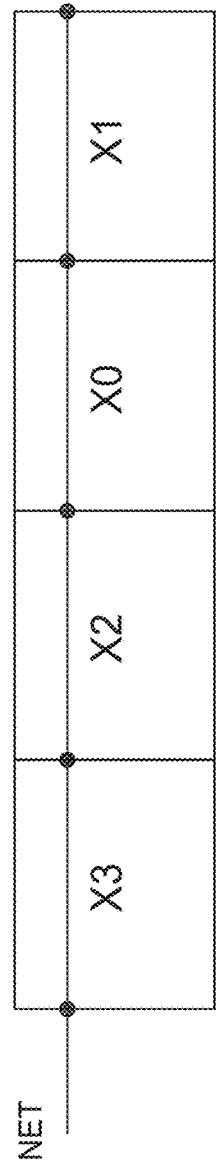
FIG. 7B illustrates a diagram of a net with unordered leaf cells, according to one or more examples.
Figure 8:
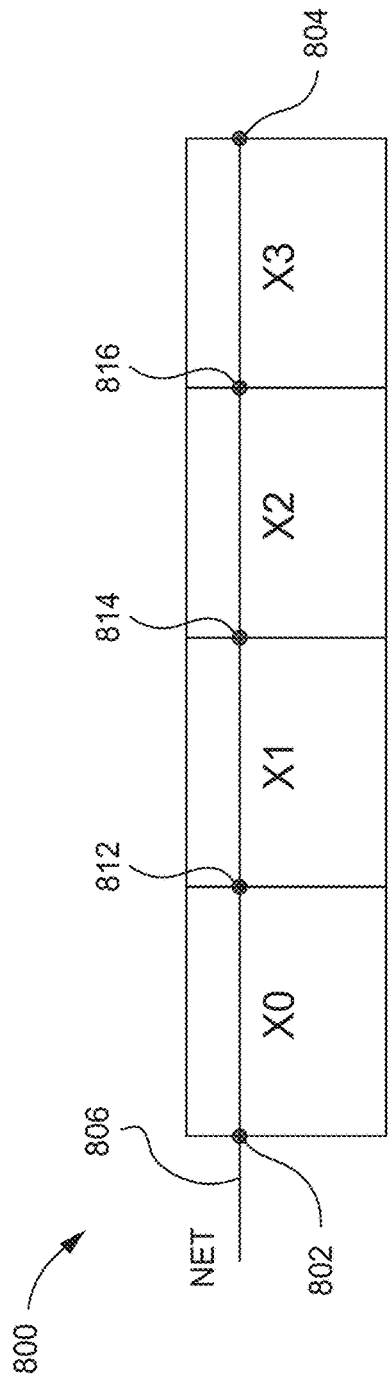
FIG. 8 illustrates a diagram of a net with sorted leaf cells, according to one or more examples.

FIG. 8 illustrates a diagram of a net with sorted leaf cells, according to one or more examples. As compared to net 700 of FIG. 7, the leaf cells of net 800 are positioned based on the placement information 144. The placement information 144 defines the location of each leaf cell relative to each other leaf cell. For example, the placement information 144 defines that the leaf cell X0 is placed next to the leaf cell X1, the leaf cell X1 is placed next to the leaf cell X2, and the leaf cell X2 is placed next to the leaf cell X3.

The placement information 144 is the physical floorplan information for the nets of the logical netlist file 146. The placement information 144 may further be referred to as the bounding box information for each leaf cell of a net.

The net analyzing engine 110 uses the nets and leaf cells of the logical netlist file 142 with the placement information 144 to sort (e.g., determine) the position of each leaf cell of each net. FIGS. 7A, 7B, and 8 illustrate an example where the net analyzing engine 110 determines the relative position of each leaf cell of a net relative to each other based on sorting.

In one or more example, each leaf cell is assigned an X, Y coordinate based on the bounding box information of the placement information 144 for the corresponding net. In one example, as illustrated in FIG. 7A, the placement information 144 defines the leaf cell X0 as starting at coordinate 0,0 (e.g., the lower left position of the leaf cell X0) and ends at coordinate 2,2 (e.g., the upper right position of the leaf cell X0). Further, as illustrated in 7A, the leaf cell X1 is defined to start at the coordinate at 2,0 (e.g., the lower left position of the leaf cell X1) and ends at the coordinate 4,2 (e.g., the upper right position of the leaf cell X1). The leaf cell X2 is defined to start at the coordinate 4,0 (e.g., the upper left position of the leaf cell X2) and ends at the coordinate 6,2 (e.g., the upper right position of the leaf cell X2), as illustrated in 7A. The leaf cell X3 is defined to start at the coordinate 6,0 (e.g., the upper left position of the leaf cell X3) and ends at the coordinate 8,2 (e.g., the upper right position of the leaf cell X3), as illustrated in 7A. The sorted (e.g., ordered) leaf cells and nets are stored as a stitched netlist file within the memory 140.

At 220 of the method 200, unique net segments are generated. For example, one or more processors of the segment generation engine 120 executes instructions stored within a memory to generate unique net segments from the sorted leaf cells in the sorted netlist file. With reference to FIG. 8, the segment generation engine 120 connects the leaf cells X0, X1, X2, and X3 using net segments based on the position of the leaf cells X0, X1, X2, and X3 relative to each other. For example, a first net segment is created between the leaf cells X0 and X1, connecting terminals of the leaf cells X0 and X1, a second net segment is created between the leaf cells X1 and X2, connecting terminals of the leaf cells X1 and X2, a third net is created between the leaf cells X2 and X3, connecting terminals of the leaf cells X2 and X3.

The leaf cells are connected to each other via a connect by an abutment process where input and output pins of adjacent, and contacting leaf cells, are connected to each other. The connections form a resistive network and the leaf cells have a parasitic resistance and a parasitic capacitance. As shown in FIG. 8, a net 800 includes the leaf cells X0, X1, X2, and X3. In one example, a signal propagates from the terminal 802 to the terminal 804. The signal propagates along a transmission line 806 connecting the leaf cells X0, X1, X2, and X3. A signal propagating along the transmission line 806 experiences delays due to the propagation properties of each of the leaf cells X0, X1, X2, and X3. The propagation properties of each leaf cell correspond to the parasitic resistances and capacitances of each leaf cell. In one example, the parasitic resistances and capacitances are modeled to transmission line 806.

To model the parasitic resistances and parasitic capacitances of a transmission line, e.g., the transmission line 806, connections are made between the leaf cells X0, X1, X2, and X3 at nodes 812, 814, and 816. A right side of the leaf cell X0 is connected to a left side of the leaf cell X1 at node 812, the right side of the leaf cell X1 is connected to the left cell X2 at node 814, and the right side of the leaf cell X2 is connected to the left side of the leaf cell X3 at node 816. In one example, the location of the connection of a net segment with a leaf cell (e.g., top port, left port, right port, bottom port) is determined based on the location where the net is determined to physically exit the leaf cell. For example, if a net is determined to exit a leaf cell on the top edge of the leaf cell, a top port is created. The top, left, right, and bottom ports may be referred to as TBLR ports.

FIG. 6 illustrates a diagram of a net including parasitic resistances and parasitic capacitances, according to one or more examples. A net 600 includes leaf cells 610, 620, 630, and 640 and corresponding parasitic resistances and capacitances 612, 614, 622, 624, 632, 634, 642, and 644. Based on generating the net segment 603, the output terminal 615 of leaf cell 610 and the input terminal 621 of the leaf cell 620 are created. The output terminal 615 of the leaf cell 610 is connected to the input terminal 621 of the leaf cell 620 via the net segment 603. Based on generating the net segment 605, the output terminal 625 of leaf cell 620 and the input terminal 631 of the leaf cell 630 are created. The output terminal 625 of the leaf cell 620 is connected to the input terminal 631 of the leaf cell 630 via the net segment 605. Further, based on generating the net segment 607, the output terminal 635 of leaf cell 630 and the input terminal 641 of the leaf cell 640 are created. Accordingly, the output terminal 635 of the leaf cell 630 is connected to the input terminal 641 of the leaf cell 640 via the net segment 607. The output terminal 645 of the leaf cell 640 is generated based on the net segment 609, and the net segment 609 is connected to the output terminal 645, and the output terminal of the net 600.

The input terminals and output terminals 611, 615, 621, 625, 631, 635, 641, and 645 may be created along any side of the corresponding leaf cells based on the position of the corresponding net segment 603, 605, 607, and 609. As illustrated in FIG. 6, the input terminals and output terminals 611, 615, 621, 625, 631, 635, 641, and 645 are positioned along the left and right sides of the leaf cells 610, 620, 630, and 640, respectively. However, in other examples, the input terminals and output terminals may be created along a top and/or bottom side, or on the same side of each of the leaf cells based on the position of the corresponding net segment.

Each of the net segments 603, 605, 607, and 609 are a segment of the corresponding transmission line 602 (e.g., a word line or other transmission line). The transmission line 602 is segmented to generate the net segments 603, 605, 607, and 609 by the segment generation engine 120. Accordingly, a single terminal between leaf cells of the logical netlist is converted into two terminals connecting leaf cells.

In one example, a unique name is assigned to each of the net segments 603, 605, 607, and 609. For example, the segment generation engine 120 generates names for each of the net segments 603, 605, 607, and 609 and assigns each of the names to the corresponding net segment. With reference to FIG. 6, the net segment 603 is identified with the name (e.g., identifier) W:0, the net segment 605 is identified with the name W:1, the net segment 607 is identified with the name W:2, and the net segment 609 is identified with the name W:3. The names for each of the net segments are stored in the memory 140.

At 230 of the method 200, the logical leaf cells are replaced with parasitic leaf cells. For example, one or more processors of the extraction engine 130 executes instructions stored in a memory to replace logical instances with parasitic instances.

Parasitic resistances and capacitances are not included within leaf cells of the logical netlist file 142. The parasitic resistances and capacitances are at a lower hierarchy level of the leaf cells. In a hierarchy, connections between leaf cells and elements within the leaf cells (e.g., parasitic resistances and parasitic capacitances) are grouped based on hierarchical levels. The hierarchy includes multiple levels of representation of a netlist. Lower hierarchical levels include details that may not be available at higher hierarchical levels. For example, at a specific level within the hierarchy, elements of the level may include hidden data which are available at a lower level of representation. For example, leaf cells of a net are at a first hierarchical level. Parasitic resistances and parasitic capacitances within the leaf cells are at lower level of hierarchy than the first hierarchical level. For example, the parasitic resistances and parasitic capacitances may be included at a second hierarchical level, where the second hierarchical level is at a lower hierarchical level than the first hierarchical level.

The extraction engine 130 extracts the parasitic resistances and parasitic capacitances of the leaf cells, and moves the parasitic resistances and parasitic capacitances up in the hierarchy such that the parasitic resistances and parasitic capacitances are included in the same hierarchy level as the leaf cells. FIG. 5 illustrates a diagram of a net based on a logical netlist, according to one or more examples. A net 500 is a net of the logical netlist file 142 and includes transmission line 502, and leaf cells 504, 506, 508, and 510. Each of the leaf cells 504, 506, 508, and 510 are connected to the transmission line 502. Each of the leaf cells 504, 506, 508, and 510 include a parasitic resistance and parasitic capacitance. However, using the logical connectivity of the logical netlist file 142, the delay of the transmission line 502 is zero and does not take into account the parasitic resistances and parasitic capacitances of the leaf cells 504, 506, 508, and 510.

The extraction engine 130 extracts the parasitic resistances and parasitic capacitances from a lower level of hierarchy to include the parasitic resistances and parasitic capacitances at the hierarchical level of the leaf cells 610, 620, 630, and 640. For example, as shown in FIG. 6, the extraction engine 130 extracts the hierarchy of the leaf cell 610 to include the parasitic resistance 612 and the parasitic capacitance 614 in the leaf cell 610. Further, the extraction engine 130 extracts the hierarchy of the leaf cell 620 to include the parasitic resistance 622 and the parasitic capacitance 624 in the leaf cell 620, and the hierarchy of the leaf cell 620 to include the parasitic resistance 632 and the parasitic capacitance 624 in the leaf cell 630. The extraction engine 130 further extracts the hierarchy of the leaf cell 640 to include the parasitic resistance 642 and the parasitic capacitance 644 in the leaf cell 640.

The parasitic resistance 612 is coupled between input and output terminals of the leaf cell 610, and the parasitic capacitance 614 is coupled to the output terminal of the leaf cell 610. The parasitic resistance 622 is coupled between input and output terminals of the leaf cell 620, and the parasitic capacitance 624 is coupled to the output terminal of the leaf cell 620. The parasitic resistance 632 is coupled between input and output terminals of the leaf cell 630, and the parasitic capacitance 634 is coupled to the output terminal of the leaf cell 630. The parasitic resistance 642 is coupled between input and output terminals of the leaf cell 640, and the parasitic capacitance 644 is coupled to the output terminal of the leaf cell 640. Accordingly, the net 600 includes parasitic resistances and parasitic capacitances that are not included within the net 500. The net 600 may be referred to a parasitic net and is stored in the memory 140 with the parasitic resistances and capacitances.

The net 600 includes the net segments 603, 605, 607, and 609. Further, net segment 603 couples the parasitic resistance 612 with the parasitic resistance 622, the net segment 605 couples the parasitic resistance 622 with the parasitic resistance 632, and the net segment 607 couples the parasitic resistance 632 with the parasitic resistance 642.

At 240 of the method 200, a parasitic netlist is generated. For example, the extraction engine 130 generates the parasitic netlist 146 based on the parasitic nets stored in the memory 140. Further, the parasitic netlist 146 is generated based on the hierarchical information for the leaf cells. The parasitic netlist 146 is stored in the memory 140. With reference to FIG. 6, the extraction engine 130 generates a parasitic netlist based on the parasitic net 600 and the corresponding hierarchical information.

Figure 10:
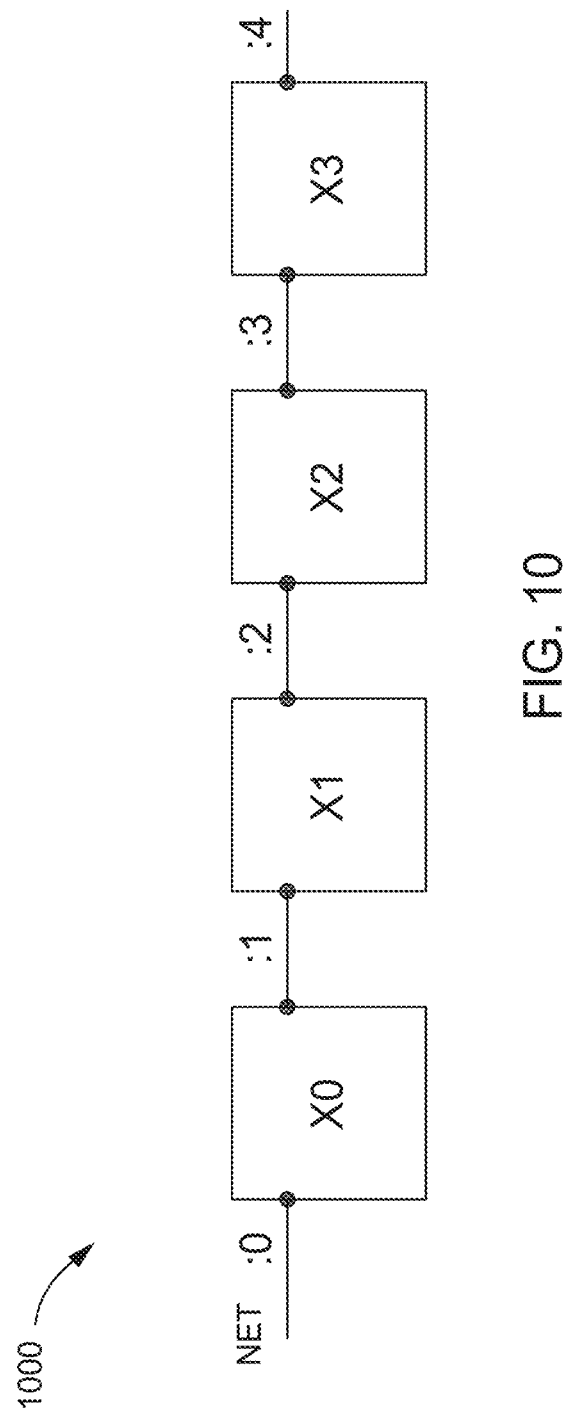
FIG. 10 illustrates a diagram of a net with example connects, according to one or more examples.

In one example, the parasitic netlist 146 includes each of the net segments. For example, the parasitic netlist 146 includes the leaf cells and corresponding net segment references. FIG. 10 illustrates a diagram of a net with example connects, according to one or more examples. In a stitched net 1000, the leaf cell X0 is connected to net:0 and net:1. Further, the leaf cell X1 is connected to net:1 and net:2, the leaf cell X2 is connected to the net:2 and net:3, and the leaf cell X3 is connected to the net:3 and net:4. The stitched net 1000 is included as a net within the parasitic netlist (e.g., the parasitic netlist 146 of FIG. 1).

Figure 3:
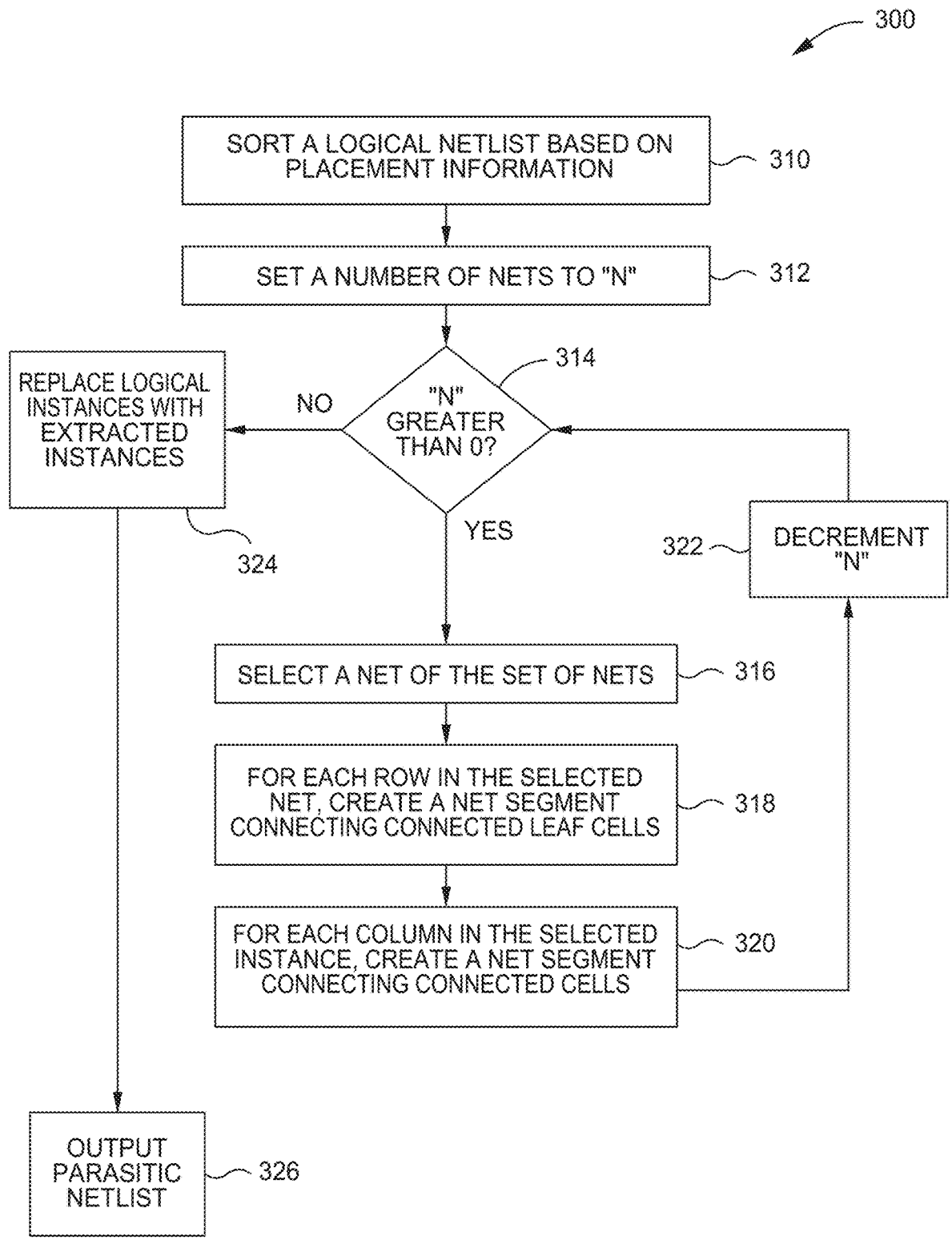
FIG. 3 illustrates a flowchart of a method for generating a parasitic netlist, according to one or more examples.

FIG. 3 illustrates a flowchart of a method for generating a parasitic netlist, according to one or more examples. A method 300 is performed by one or more processors of the compiler system 100 executing instructions stored in a memory to generate the parasitic netlist, according to one embodiment. At 310, a logical netlist is sorted based on placement information. For example, the net analyzing engine 110 sorts the leaf cells of the nets within the logical netlist file 142 based on the placement information 144. 310 of the method 300 is performed similar to 210 of the method 200 of FIG. 2.

At 312 of the method 300, a number of nets within the netlist is set to "N". For example, the segment generation engine 120 identifies the nets within the logical netlist file 142 and generates a set of nets including the nets within the logical netlist file 142. The number of nets N in the set of nets is the number of nets identified within the logical netlist file 142.

At 314 of the method 300, a determination as to whether or not the value of N is greater than zero is made. The net analyzing engine 120 determines whether or not the value of N is greater than zero. If the value of N is greater than zero, the method 300 continues to 316 of the method 300. At 316 of the method 300, a net is selected from set of nets. The selected net is a net that was not previously selected. The net analyzing engine 120 selects a net from the unselected nets of the set of nets.

At 318, for each row in the selected net, a net segment connecting the leaf cells is created. For example, the segment generation engine 120 creates net segments for connected leaf cells.

Figure 9:
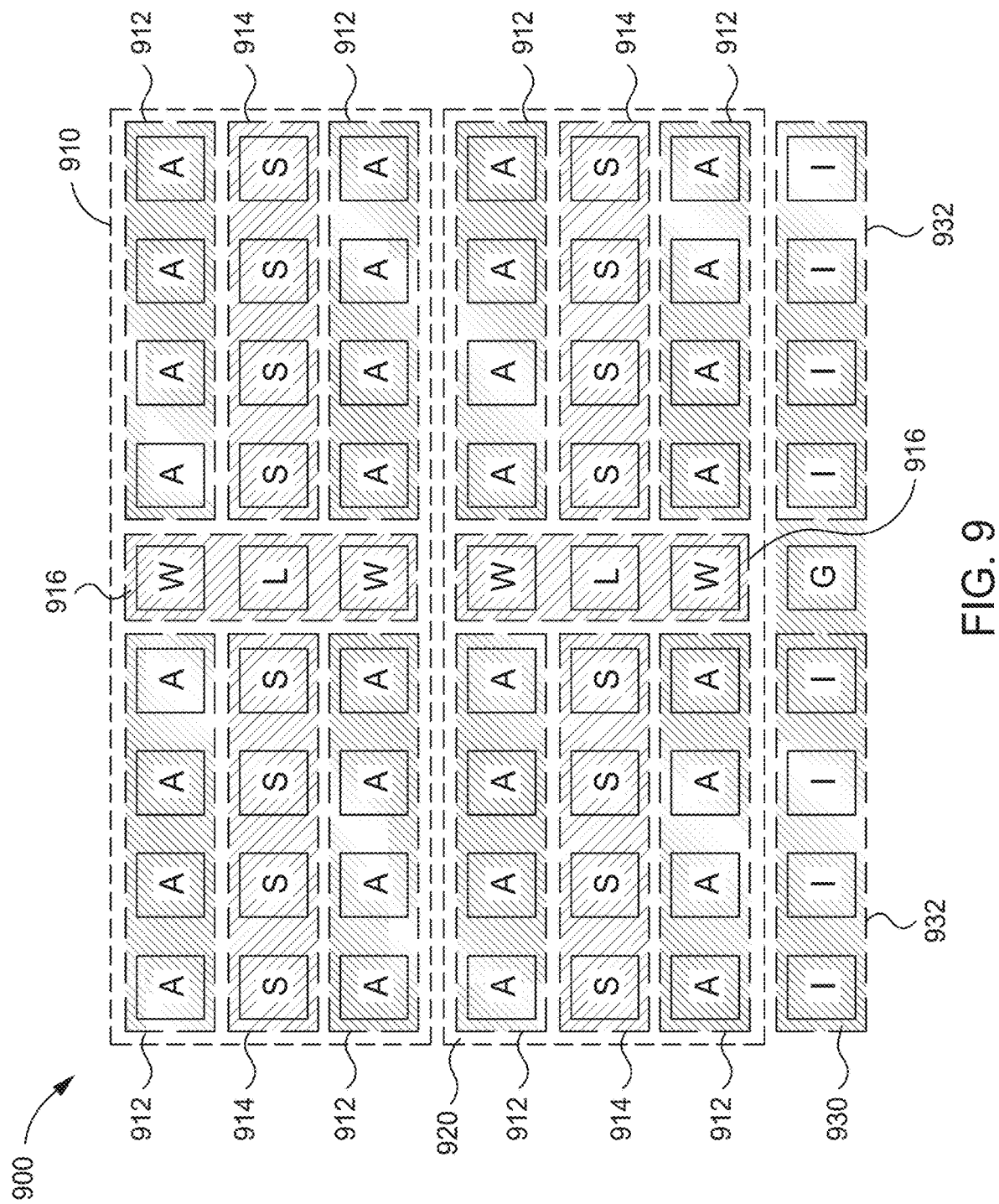
FIG. 9 illustrates a diagram of an example memory device, according to one or more examples.

FIG. 9 illustrates a diagram of an example memory instance, according to one or more examples. A memory instance 900 includes intermediate layers 910, 920, and 930. The intermediate layers 910, 920. 930 are made up of one or more of the layers 912, 914, 916, 930, and 932. For example, the intermediate layer 910 includes layers 912, 914, and 916. The intermediate layer 920 includes layers 912, 914 and 916. The intermediate layer 930 includes layers 912, 914, and 916. In other examples, the intermediate layers may include other combination of layers, and may include more or less layers than that depicted in FIG. 9. The intermediate layers 910, 920, and 930 are used to form the memory instance 900. In one example, a memory instances includes more than three intermediate layers. In one example, the intermediate layers 910, 920, and 930 may be used to generate various different memory instances based on the corresponding designs. In one example, an intermediate layer is a first level of representation of a memory instance and includes one or more layers. Further, a layer is a second level of representation below the intermediate layer and includes one or more leaf cells. The intermediate layers 910 and 920, include layers that include leaf cells A, S, and W, and the intermediate layer 930 includes layers that include leaf cells I and G. The leaf cells A, S, W, I, and G correspond to different types of leaf cells. The leaf cells are part of layers 912, 914, 916, 930, and 932. The layers 912, 914, 916, 930, and 932 may be disposed along one or more dimensions. For example, the layers 912, 914, 916, 930, and 932 may be one dimensional (e.g., in the X or Y direction) or multi-dimensional (e.g., in both the X and Y and directions). A one dimensional net may include a row of leaf cells or a column of leaf cells. Two dimension net may include multiple rows of leaf cells and/or multiple columns of leaf cells.

Figure 4A:
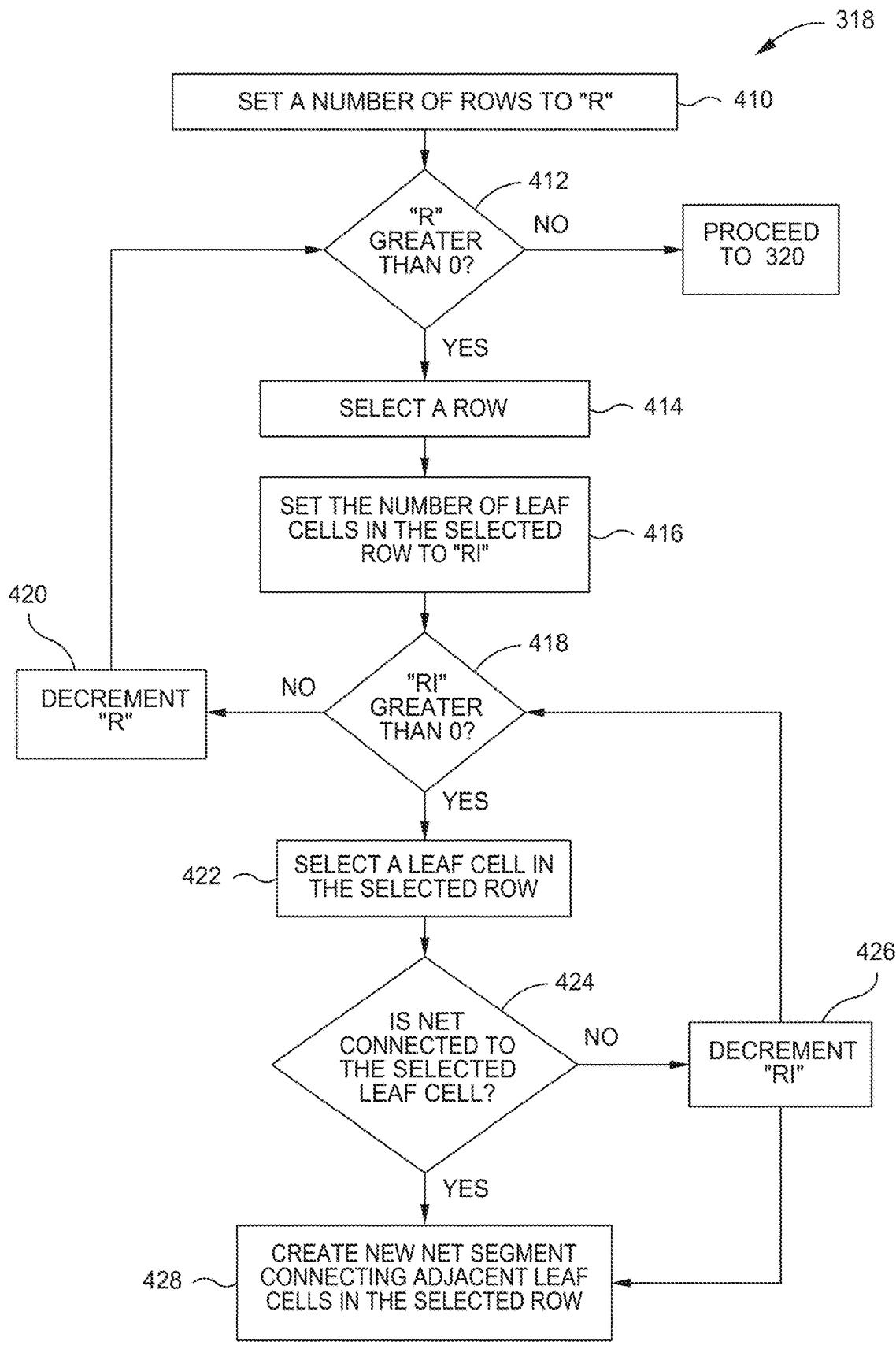
FIG. 4A illustrates a flowchart of a method for generating net segments between leaf cells of a row, according to one or more examples.

FIG. 4A illustrates a flowchart of a method for generating net segments between leaf cells of a row, according to one or more examples. The process 318 of the method 300 may be further elaborated by the steps of FIG. 4A. At 410, the number of rows in the selected net is set to R. At 412, the value of R is compared to zero. For example, the segment generation engine 120 compares the value of R to zero. If the value of R is determined to be greater than zero, a row of the selected net is selected at 414. The segment generation engine 120 selects a row from the selected net.

At 416, the number of leaf cells in the selected row is set to "RI" by the segment generation engine 120. At 418, the value of RI is compared to zero by the segment generation engine 120. If the value of RI is greater than zero, a previously unselected leaf cell in the selected row is selected at 422. The segment generation engine 120 selects a leaf cell in the selected row.

At 424, a determination as to whether or not the selected leaf cell is connected to the net is made. For example, with reference to FIG. 6, the leaf cell 610 is selected and a determination as to whether or not the leaf cell 610 is connected to the transmission line 602 (e.g., the net) is made. If the leaf cell 610 is connected to the transmission line 602, a net segment connecting the selected leaf cell with adjacent and connected leaf cells in the selected row is made at 428. For example, the net segment 603 connecting the leaf cell 610 and the leaf cell 620 is made.

The value RI is decremented at 426 after the net segment is made at 428. RI is then compared to 0 at 418 to determine if the value of RI is greater than zero. If the value of RI is greater than zero, 422, 424, 426, and 428 are repeated until RI is determined to be zero at 418. Further, if at 424, the selected leaf cell is not determined to be connected to the selected net, the value of RI is decremented at 426, and then compared to zero at 418.

If RI is determined to be zero at 418, e.g., all of the leaf cells in a selected row have been analyzed, the value of R is decremented at 420. The value of R is compared to zero at 412. If the value of R is determined to be zero at 412, the method 300 proceeds to 320 of FIG. 3. If the value of R is determined to be greater than zero at 412, 414-420 are repeated.

With reference to FIG. 6, completing 410-428 of FIG. 4A generates the net segments 603, 605, 607, connecting each of the leaf cells 610, 620, 630, and 640. Further, the net segment 609 at the output terminal of the net 600 is generated.

Figure 4B:
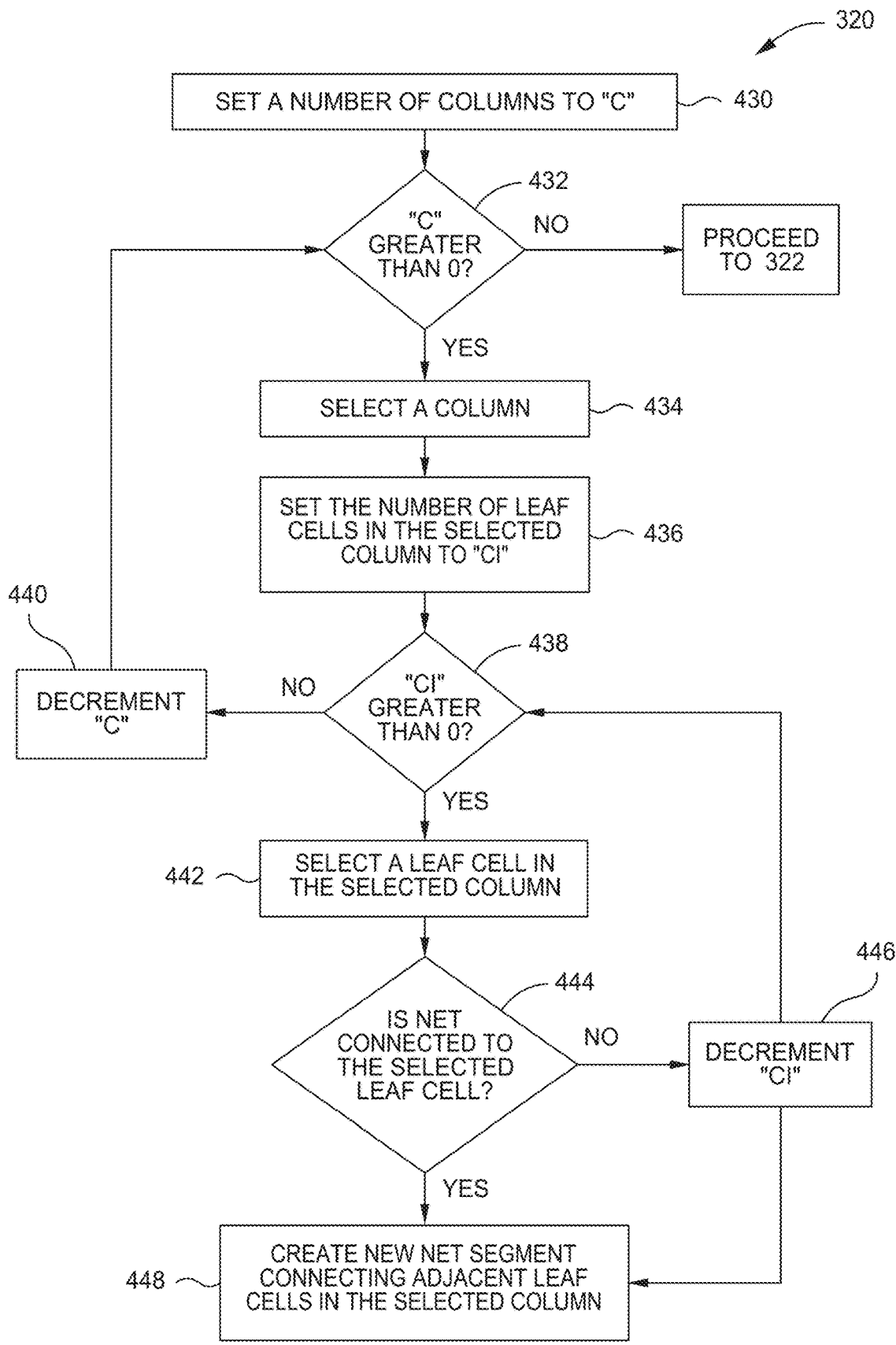
FIG. 4B illustrates a flowchart of a method for generating net segments between leaf cells of a column, according to one or more examples.

With further reference to FIG. 3, at 320 of the method 300, for each column in the selected net, a net segment connecting connected leaf cells is created. For example, the segment generation engine 120 creates net segments for connected leaf cells in a column. FIG. 4B illustrates a flowchart of a method for generating net segments between leaf cells of a column, according to one or more examples. The process 320 of the method 300 may be further elaborated by the steps of FIG. 4B. At 430, a number of columns in the selected net is set to C. C has a value of one or more. C is equal to the number of columns in the selected net.

At 432, the value of C is compared to zero. For example, the segment generation engine 120 compares the value of C to zero. If the value of C is determined to be greater than zero, a column of the selected net is selected at 434. The segment generation engine 120 selects a column from the selected net.

At 436, the number of leaf cells in the selected column is set to "CI" by the segment generation engine 120. At 438, the value of CI is compared to zero by the segment generation engine 120. If the value of CI is greater than zero, a previously unselected leaf cell in the selected column is selected at 442. The segment generation engine 120 selects a leaf cell in the selected column.

At 444, a determination as to whether or not the selected leaf cell is connected to the net is made. The value CI is decremented at 446 after the net segment is made at 448. CI is then compared to zero at 438 to determine if the value of CI is greater than zero. If the value of CI is greater than zero, 442, 444, 446, and 448 are repeated until CI is determined to be zero at 438. Further, if at 444 the selected leaf cell is not determined to be connected to the selected net, the value of CI is decremented at 446, and then compared to zero at 438.

If CI is determined to be zero at 438, e.g., all of the leaf cells in a selected row have been analyzed, the value of C is decremented at 440. The value of C is compared to zero at 432. If the value of C is determined to be zero at 432, the method 300 proceeds to 322 of the method 300. If the value of C is determined to be greater than zero at 432, 434-440 are repeated.

At 322 of the method 300, the value of N is decremented. For example, the segment generation engine 120 decrements the value of N. The method 300 returns to 314, where a determination as to whether or not the value of N is greater than zero. If the value of N is greater than zero, 316-322 are repeated. If, at 314, N is determined to be zero, the method 300 proceeds to 324. At 324 of the method 300, logical instances are replaced with extracted instances. The extracted instances are leaf cells that include parasitic resistances and parasitic capacitances. For example, one or more processors of the extraction engine 130 executes instructions stored in a memory to replace leaf cells of the logical netlist file (e.g., the logical netlist file 142) with leaf cells that include parasitic resistances and/or capacitances.

As is described above, the extraction engine 130 extracts the parasitic resistances and parasitic capacitances of the leaf cells based on the hierarchy of the leaf cells, and moves the parasitic resistances and parasitic capacitances up in the hierarchy such that the parasitic resistances and parasitic capacitances are included in the same hierarchy level as the leaf cells.

At 326 of the method 300, a parasitic netlist is generated. For example, the extraction engine 130 generates a parasitic netlist based on the parasitic nets stored in the memory 140. For example, the extraction engine 130 generates a parasitic netlist based on the parasitic nets and stores the parasitic netlist 146 in the memory 140.

Figure 11:
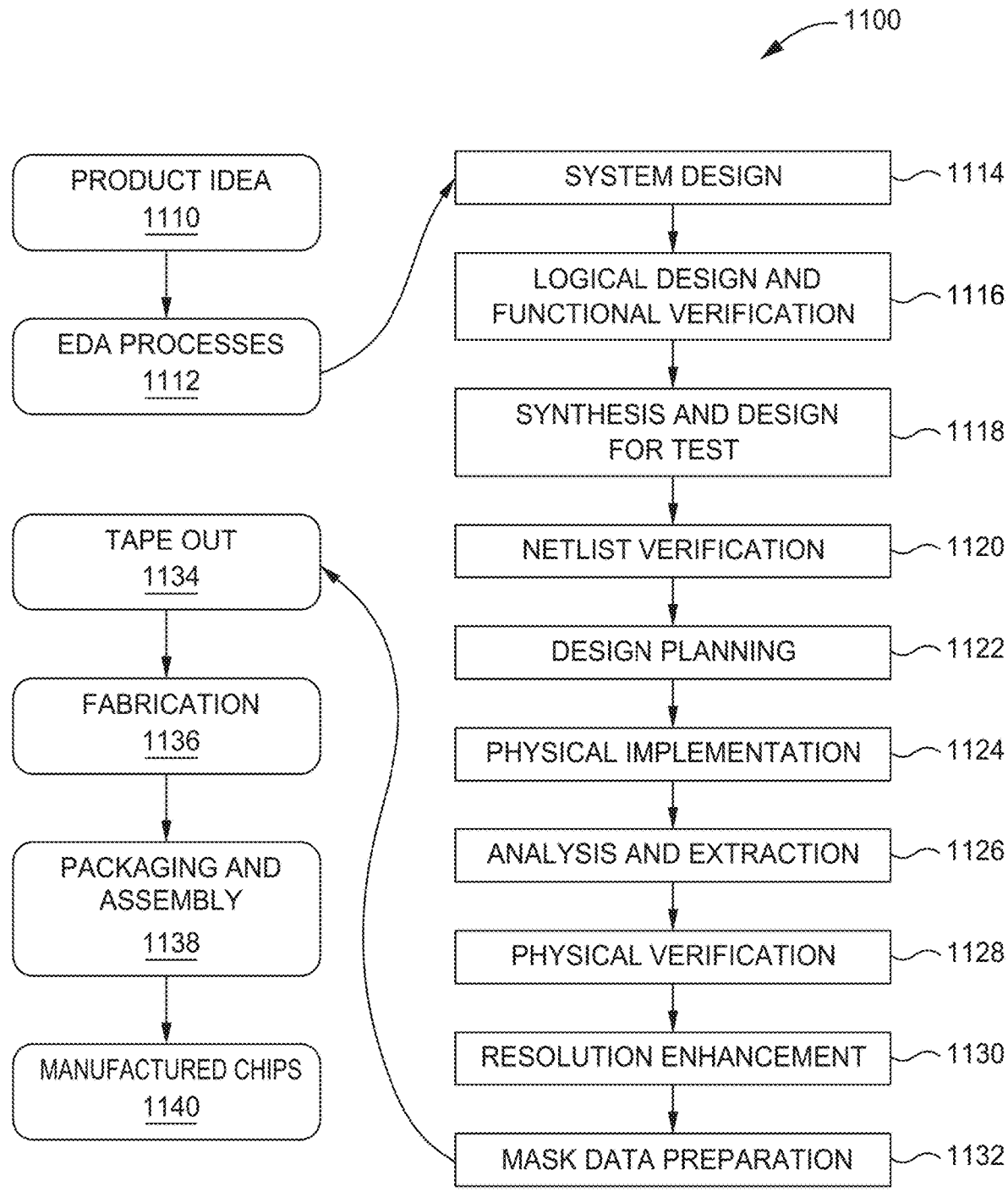
FIG. 11 depicts a flowchart of various processes used during the design and manufacture of an integrated circuit in accordance with some embodiments of the present disclosure.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 11. The processes described by be enabled by EDA products (or tools).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as computer system 1200 of FIG. 12) may be used to store the programs and data structures that are used by some or all of the EDA products described herein, and products used for development of cells for the library and for physical and logical design that use the library.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving a logical netlist file for a memory device and placement information for the memory device, the logical netlist file includes memory instances of the memory device, wherein each memory instance includes leaf cells;
   determining a location of a first leaf cell and a location of a second leaf cell of the leaf cells of a first memory instance of the memory instances based on the placement information;
   generating a first net segment between the first leaf cell and the second leaf cell based on the location and parasitic elements of the first leaf cell and the location and parasitic elements of the second leaf cell; and
   generating, by a processor, a parasitic netlist based on the first net segment and the parasitic elements of the first leaf cell and parasitic elements of the second leaf cell.

2. The method of claim 1 further comprises replacing the first leaf cell with a first parasitic leaf cell based on the parasitic elements of the first leaf cell, wherein the parasitic elements of the first leaf cell comprise a first parasitic resistance and a first parasitic capacitance.

3. The method of claim 2, wherein the first net segment connects the first parasitic resistance with a second parasitic resistance of the parasitic elements of the second leaf cell.

4. The method of claim 1, wherein determining the location of the first leaf cell and the location of the second leaf cell comprises determining that the first leaf cell is adjacent to and connected to the second leaf cell.

5. The method of claim 1, wherein generating the first net segment between the first leaf cell and the second leaf cell comprises generating the first net segment to connect an output terminal of the first leaf cell with an input terminal of the second leaf cell.

6. The method of claim 1 further comprising:
   determining a location of a third leaf cell of the leaf cells of the first memory instance based on the placement information;
   generating a second net segment between the second leaf cell and the third leaf cell; and
   generating the parasitic netlist further based on the second net segment.

7. The method of claim 1, wherein the parasitic netlist includes an identifier for the first net segment.

8. A system comprising:
   a memory storing instructions; and
   a processor, coupled with the memory and configured to execute the instructions, the instructions when executed cause the processor to:
      receive a logical netlist file for a memory device and a placement information for the memory device, the logical netlist file includes a plurality of nets and a plurality of leaf cells;
      select a first net of the plurality of nets, the first net including first leaf cells of the plurality of leaf cells;
      generate a first net segment for the first net, the first net segment connecting a first leaf cell and a second leaf cell of the first leaf cells; and outputting a parasitic netlist generated based on the first net segment.

9. The system of claim 8, wherein generate the first net segment comprises:
selecting a first row within the first net, the first row comprising the first leaf cell and the second leaf cell;
determining that the first leaf cell is connected to the first net;
determining that the second leaf cell is connected to the first net and is adjacent to the first leaf cell; and
connecting an output terminal of the first leaf cell with an input terminal of the second leaf cell.

10. The system of claim 9, wherein generating the first net segment further comprises:
determining that a third leaf cell of the first leaf cells is connected to the first net and is adjacent to the second leaf cell; and
connecting an output terminal of the second leaf cell with an input terminal the third leaf cell.

11. The system of claim 9 wherein the instructions further cause the processor to: generating a second net segment for the first net, the second net segment connecting a fourth leaf cell and a fifth leaf cell of the first leaf cells.

12. The system of claim 11, wherein generating the second net segment comprises:
selecting a first column within the first net, the first column comprising the fourth leaf cell and the fifth leaf cell;
determining that the fourth leaf cell is connected to the first net;
determining that the fifth leaf cell is connected to the first net and adjacent to the fourth leaf cell;
connecting an output terminal of the fourth leaf cell with an input terminal of the fifth leaf cell.

13. The system of claim 8, wherein the instructions further cause the processor to:
replace logical instances of the plurality of leaf cells of the logical netlist file with extracted instances of the plurality of leaf cells, wherein the extracted instances include parasitic resistances and parasitic capacitances of the plurality of leaf cells.

14. The system of claim 13, wherein the parasitic netlist is further generated based on the extracted instances.

15. A non-transitory computer readable medium comprising stored instructions, which when executed by a processor, cause the processor to:
determine a location of a first leaf cell and a second leaf cell of leaf cells of a first memory instance of a memory device from a logical netlist file based on placement information;
generate a first net segment between the first leaf cell and the second leaf cell based on the location of the first leaf cell and the second leaf cell;
replace one or more of the first leaf cell with a first parasitic leaf cell and the second leaf cell with a second parasitic leaf cell based on hierarchical information of the first leaf cell and the second leaf cell; and
generate a parasitic netlist based on the first net segment, and at least one of the first parasitic leaf cell and the second parasitic leaf cell.

16. The non-transitory computer readable medium of claim 15, wherein the first parasitic leaf cell comprises a first parasitic resistance and a first parasitic capacitance and the second parasitic leaf cell comprises a second parasitic resistance and a second parasitic capacitance.

17. The non-transitory computer readable medium of claim 16, wherein the first net segment connects first parasitic resistance with the second parasitic resistance.

18. The non-transitory computer readable medium of claim 15, wherein determining the location of the first leaf cell and the second leaf cell comprises determining that the first leaf cell is adjacent to and connected to the second leaf cell.

19. The non-transitory computer readable medium of claim 15, wherein generating the first net segment between the first leaf cell and the second leaf cell comprises generating the first net segment to connect an output terminal of the first leaf cell with an input terminal of the second leaf cell.

20. The non-transitory computer readable medium of claim 15, wherein the processor is further caused to:
determine a location of a third leaf cell of the leaf cells of the first memory instance based on the placement information;
generate a second net segment between the second leaf cell and the third leaf cell; and
generate the parasitic netlist further based on the second net segment.

* * * * *